Figure 6:
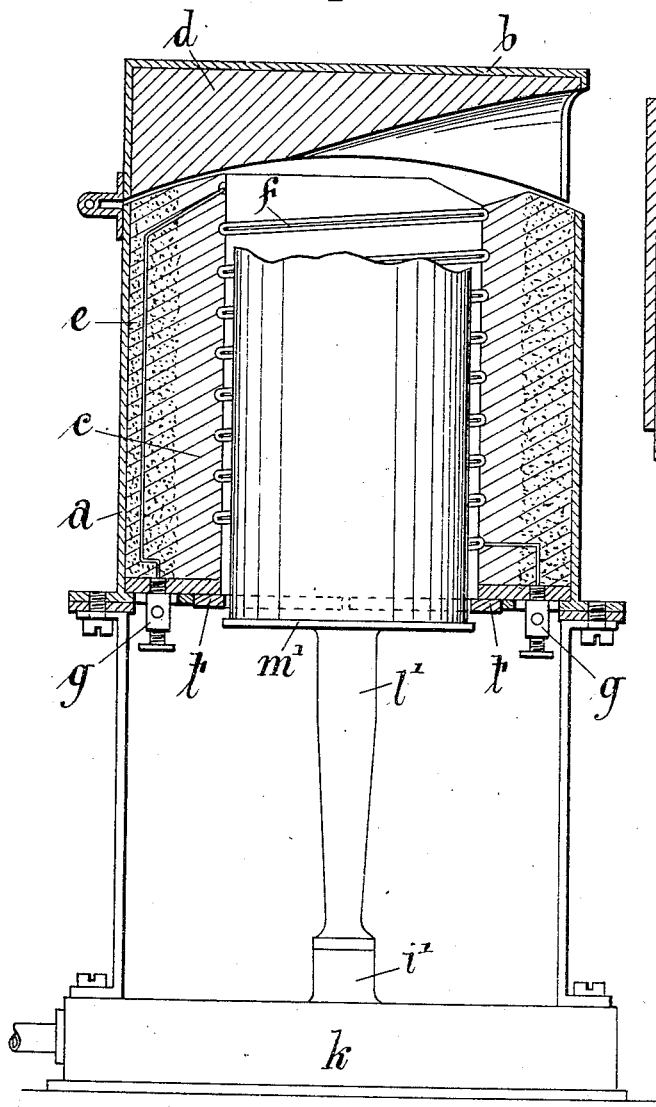

W. B. C. KAISER.
DENTAL CASTING APPARATUS.
APPLICATION FILED SEPT. 2, 1913.
1,115,678.
Patented Nov. 3, 1914.
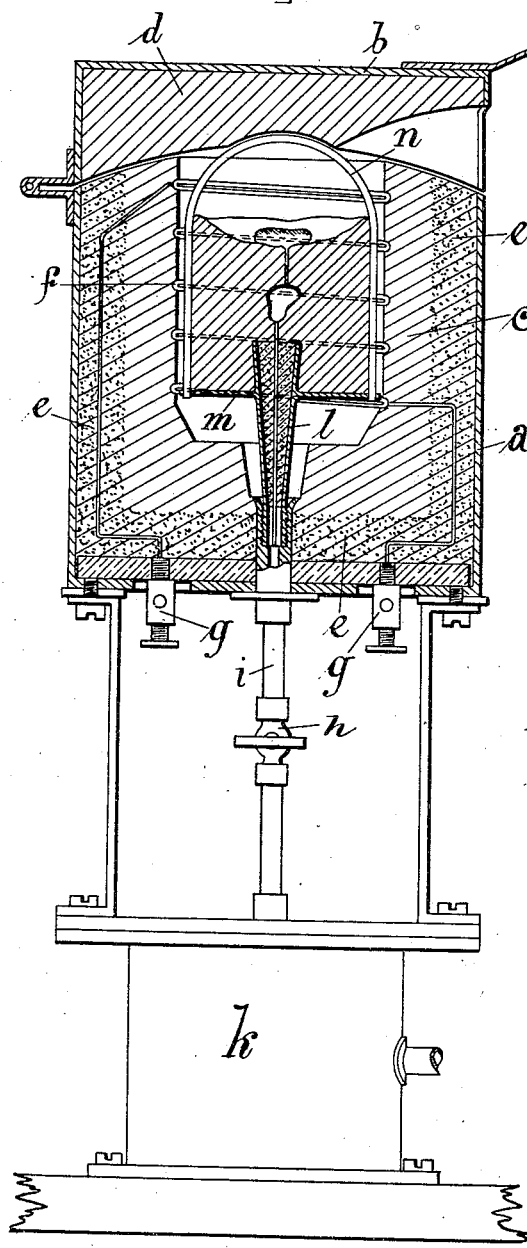
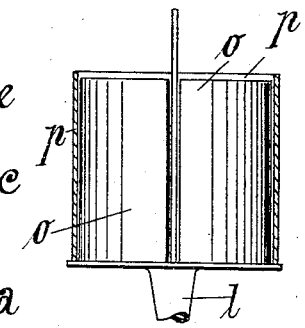
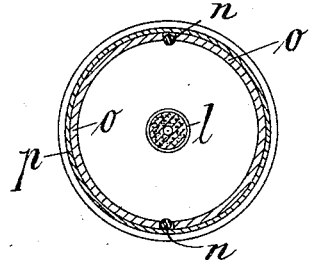
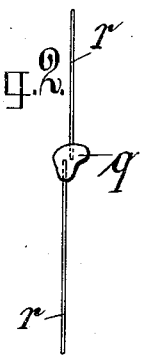

W. B. C. KAISER.
DENTAL CASTING APPARATUS.
APPLICATION FILED SEPT. 2, 1913.

1,115,678.

Patented Nov. 3, 1914.
2 SHEETS—SHEET 2.

Witnesses:
P. W. Dommers
E. Leckert

Inventor,
William B. C. Kaiser,
By Henry Ortt
atty.

UNITED STATES PATENT OFFICE.

WILLIAM BOLIVAR CARL KAISER, OF HAMBURG, GERMANY.

DENTAL CASTING APPARATUS.

1,115,678.    Specification of Letters Patent.    Patented Nov. 3, 1914.

Application filed September 2, 1913. Serial No. 787,707.

*To all whom it may concern:*

Be it known that I, WILLIAM BOLIVAR CARL KAISER, a subject and resident of Hamburg, in the German Empire, have invented new and useful Improvements in Dental Casting Apparatus, of which the following is a specification.

The present invention relates to improvements in apparatus for the production of teeth-plugs, stoppings or fillings composed of china, porcelain or similar material, and has for its objects to provide an arrangement which will enable such plugs, stoppings or fillings to be produced in a simple and economical manner.

Hitherto known casting devices in which the molten filling material was forced into the mold by suction cannot be used for manufacturing fillings of porcelain on account of the high melting temperature of the porcelain and on account of the difficulty of producing an absolute tight joint between the mold and the suction pipe, which could withstand the great heat. For this reason fillings of porcelain have hitherto been made in a platinum-foil, shaped to the cavity of the tooth, the porcelain material being applied repeatedly and then burnt each time, until the platinum-foil is filled up to the proper degree. This method of course is very tedious and expensive.

In the device for producing porcelain fillings, forming the subject of the present invention, a mold carrying tube is arranged in the melting chamber of an electric furnace. The mold carrier, which is connected with a suction pipe, projects with its upper end into the (casting) mold provided with air ducts and is firmly embraced by the mold.

By reason of the arrangement of the mold directly within the melting chamber of the melting furnace, the heat is taken advantage of to the greatest possible degree, and since the mold incloses the carrier tube, the contraction of the mold, which is unavoidable at such great heat and which heretofore caused leakages at the joint, between the mold and the suction pipe, is in this case not only harmless but assists in improving the closeness of the joint, so that failures on account of insufficient sucking power are always avoided. The mold carrying tube is provided with a flange, which together with a mantle forms the mold chest.

In the drawings two modes of construction of the apparatus are shown.

Figure 5:
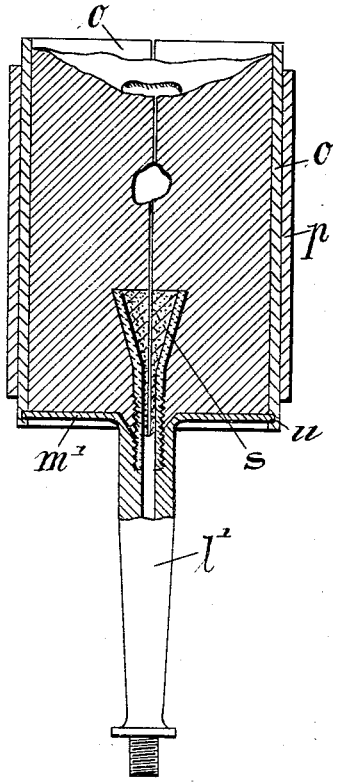

Figure 1 is a vertical section of an electric furnace and one form of casting apparatus. Fig. 2 is an elevation of one form of a model for producing the mold for the plug or filling. Fig. 3 is an elevation, partly in section, of the mold chest seen at right angles to Fig. 1. Fig. 4 is a horizontal section of Fig. 3. Fig. 5 is a vertical section of a modified form of mold chest showing a mold formed therein, and Fig. 6 is a partial elevation of the mold chest shown in Fig. 5 and mounted in an electric furnace which is shown in section.

The electric furnace consists of a casing or cylinder $a$ having a hinged cover $b$. Both parts are provided with a lining $c$ and $d$ respectively, of refractory material. The latter is held apart from the metal by a layer $e$ of asbestos for preventing loss of heat. Within the wall of the cylindrical melting chamber $f$ an electric spirally shaped heating wire is embedded, the ends of which are fastened to binding screws $g$. Into the bottom of the casing or cylinder $a$ projects a suction pipe or tube $i$, which is provided with a cock $h$ and which is in connection with a tank or vessel $k$, in which a vacuum can be created in any known manner. Into the upper end of the suction pipe $i$ projecting into the casing $a$ is screwed a conical platinum tube $l$, which forms the mold carrier and which at a certain distance from its upper end is provided with a disk shaped flange $m$, also of platinum. A U-shaped hoop $n$ is fastened to the flange $m$ and serves as a handle for the mold carrying tube $l$. To procure the mold of plaster of Paris two semi-cylindrical troughs $o$, (Figs. 3 and 5) are used, which are placed upright on the flange $m$ in such manner that they abut against the legs of the hoop $n$ and together with the same form a mold-chest, the bottom of which is formed by the flange $m$. A mantle $p$ embracing the two semi-cylindrical halves $o$ holds the parts together.

When a plug or filling is to be produced the model of the filling (Fig. 2) formed in a known manner of a wax body $q$ and wires $r$, are placed into the mold-chest in such manner, that the lower and longer wire $r$ is placed in the axis of the mold carrying tube $l$ and the wax body $q$ is situated somewhere about half the height of the mold chest. The mold carrying tube is previously filled with a mixture of a paste of plaster of Paris and asbestos wool, which when hardened holds the model in the proper position. Plaster of Paris is then run into the troughs and as soon as the plaster of Paris has hardened the wires $r$ are withdrawn and also the semi cylindrical troughs $o$ are removed. The plaster of Paris is thereby firmly attached with the mold carrying tube on account of its conical shape. The latter is now brought into the melting chamber of the furnace and screwed down into the upper end of the suction pipe $i$, the hoop $n$ serving as a handle. On the top of the mold a piece of porcelain is placed and the cover $b$ finally shut.

When the electric current is closed not only the heating wire $f$, but also the wall of the chamber is heated to white heat. The intense heat acting directly on the mold and on the porcelain causes the latter to melt into a sufficiently fluid state, so that, when the cock $h$ is opened the vacuum sucks the liquid porcelain down into the mold, the wax body $q$ having been completely absorbed in the meantime. The lower channel formed by the lower wire $r$ holding the wax body $q$ can be omitted altogether. As above described, the mold carrying tube $l$ is filled with a mixture of paste, of plaster of Paris and asbestos wool which when hardened holds the mold in the proper position. By placing the wax body $q$ on the top of the described hardened mixture in the carrying tube and forming the mold by pouring plaster of Paris into the mold-chest, then after the plaster of Paris is hardened, the one wire projecting on top being pulled out, and therefore, having used no lower wire, there will be no channel within the mixture of plaster of Paris and asbestos in the tube $l$ so that there can be no fear of the molten casting material passing down the tubes "$l$" and "$l'$." But even if the lower wire $r$ is used the temperature within the lower part of the furnace will not be sufficient to allow the molten material to run down the full length of the channel formed by the lower wire $r$. The molten material may enter the channel, which opens out into the hollow of the mold proper after the wax has been melted and sucked up by the surrounding plaster of Paris, but it will not run as far as the lower end of this channel for the reason that the temperature decreases toward the outer surface of the furnace.

The temperature necessary for melting porcelain is extremely high and great difficulty is met with to obtain this temperature, and it is evident that the temperature may be obtained in the very center of the furnace while at the lower end it is insufficient for keeping the porcelain in a molten state.

In the construction shown in Figs. 5 and 6 the mold carrying tube $l'$ is provided at its upper end with a flange $m'$ and into said tube is screwed a special tube $s$ made of chamotte, hard-porcelain, quartz or other refractory material. This special tube previously filled by a paste of plaster of Paris and asbestos fibers will be embraced by the mold in producing the same. The advantage of making use of such a special tube is that the expensive platinum may be avoided and this construction has a further advantage inasmuch as the flange will not be subjected to the direct action of the heat of the melting chamber. To obtain this advantage the melting chamber of the melting furnace is made open at the bottom, so that the tube $l'$ carrying the mold when introduced from above projects through the bottom of the melting furnace and is finally screwed to the suction pipe $i'$. The flange $m'$ is then situated below and outside of the melting chamber the opening being covered by two semicircular cover plates $t$. The troughs $o$ forming the mold chest are provided on the bottom at the inner wall with a groove $u$, by which the troughs $o$, being held together by the mantle $p$, embrace the flange $m'$ to produce a good hold. The last described construction has the advantage, that the semi-cylindrical halves of the mold chest are firmly and tightly connected with the flange.

I claim:

1. In a dental casting apparatus, a mold support comprising two tubes, one of which is inserted in the other, a flange on one of the tubes for supporting the mold, one of said tubes also projecting into the mold.

2. In a dental casting apparatus, a mold support comprising a tube adapted to carry the casting mold, a second tube made of refractory material and adapted to be inserted into the first named tube at one end, and project into the mold with its other end, one of the tubes being provided with a flange to support the mold.

3. A dental casting apparatus, comprising an electric furnace open at its lower end, a tube to carry the casting mold, a second tube made of refractory material adapted to be inserted into the first named tube at one end and into the mold with its other end, a flange on the first named tube being outside of the furnace when the mold is inserted.

4. In a dental casting apparatus, a mold support comprising a tube having a flange to support the mold, and a model supporting tube made of refractory material having one end inserted in the mold supporting tube and the other end adapted to project into the body of the mold.

5. In a dental casting apparatus, the combination of a mold support, comprising two tubes, one of which is inserted in the other, a flange on one of the tubes for supporting the mold, one of said tubes projecting into the mold, and a removable mold chest comprising two semi-cylindrical troughs mounted on the flange, and a mantle adapted to embrace said troughs to hold the latter together during the formation of the mold.

WILLIAM BOLIVAR CARL KAISER.

Witnesses:
F. A. MAX KAEMPFF,
ERNEST H. L. MUMMENHOFF.